US012105515B2

(12) United States Patent
Mene et al.

(10) Patent No.: US 12,105,515 B2
(45) Date of Patent: Oct. 1, 2024

(54) PATH DISCOVERY IN AN UNKNOWN ENCLOSED SURROUNDING BASED ON DIRECTION OF LIGHT AND AIR MOVEMENT

(71) Applicant: INTERNATIONAL BUSINESS MACHINES CORPORATION, Armonk, NY (US)

(72) Inventors: Atul Mene, Morrisville, NC (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/804,101

(22) Filed: May 26, 2022

(65) Prior Publication Data
US 2023/0384792 A1 Nov. 30, 2023

(51) Int. Cl.
G05D 1/00 (2024.01)
(52) U.S. Cl.
CPC ................. *G05D 1/0221* (2013.01)
(58) Field of Classification Search
CPC ............ G05D 1/0221; G05D 2105/87; G05D 2107/50; G05D 2111/10; G05D 2111/56; G05D 1/243; G05D 1/248
See application file for complete search history.

(56) References Cited

U.S. PATENT DOCUMENTS

| 9,140,559 | B2 | 9/2015 | Khorashadi |
| 9,188,983 | B2 | 11/2015 | Stout |
| 10,612,929 | B2 | 4/2020 | Afrouzi |
| 10,698,413 | B2 | 6/2020 | Lau |
| 11,199,853 | B1 | 12/2021 | Afrouzi |
| 11,222,299 | B1 * | 1/2022 | Baalke ................ G06Q 10/087 |
| 11,249,482 | B2 | 2/2022 | Munich |
| 2019/0302784 | A1 * | 10/2019 | Benosman ............... G08G 1/22 |
| 2022/0047135 | A1 * | 2/2022 | Lee ..................... A47L 11/4011 |

FOREIGN PATENT DOCUMENTS

CN 112629542 A * 4/2021

OTHER PUBLICATIONS

F. Ducatella et al. "New task allocation methods for robotic swarms", 2009. (Year: 2009).*
Junzhi Yu et al. "One a Miniature Free-Swimming Robotic Fish with Multiple Sensors", 2016. (Year: 2016).*
Machine translation CN 112629542 (Year: 2021).*

(Continued)

*Primary Examiner* — Anne Marie Antonucci
*Assistant Examiner* — Misa H Nguyen
(74) *Attorney, Agent, or Firm* — Jordan T. Schiller

(57) ABSTRACT

The present invention may include a processor that monitors location of a robot in an environment. The processor captures the environment with one or more environment sensors. The processor analyzes the captured environment to determine an exit location. The processor validates an exit route based on historical data and the exit location and communicates the exit route to the robot.

20 Claims, 5 Drawing Sheets

(56) References Cited

OTHER PUBLICATIONS

Jo Decuyper et al. "The fluid dynamics applied to mobile robot motion: the stream field method.", 1994 (Year: 1994).*
Ackerman, "Team CoSTAR Trains Robots for Exploring Caves on Earth and Space > Spot tackles lava tubes as JPL prepares for the final DARPA SubT event," IEEE Spectrum, Dec. 22, 2020, https://spectrum.ieee.org/team-costar-robots-earth-space, 16 pages.
Altaf, "The New Space Age: IBM Develops A Unique, Custom Edge Computing Solution in Space," IBM, Feb. 19, 2021, https://www.ibm.com/cloud/blog/ibm-develops-a-unique-custom-edge-computing-solution-in-space, 8 pages.
Disclosed Anonymously, "Adaptive Digital Twin Layout Discovery Through Movement Tracking," IP.com, IP.com No. IPCOM000262034D, IP.com Publication Date: Apr. 27, 2020, 8 pages.
Disclosed Anonymously, "Dynamic Illumination Level and Vectoral Direction of Light Control During Surgery," IP.com, IP.com No. IPCOM000262354D, IP.com Publication Date: May 21, 2020, 6 pages.
Disclosed Anonymously, "Method and System for Dynamic Airflow Path Control in Data Centers," IP.com, IP.com No. IPCOM000259789D, IP.com Publication Date: Sep. 18, 2019, 5 pages.
Fu, "Particle Tracking Velocimetry for indoor airflow field: A review," HAL Open Science, Apr. 29, 2015, https://hal.archives-ouvertes.fr/hal-01146987/document, 37 pages.
Hjogg et al., "Algorithms and Sensors for Small Robot Path Following," IEEE Xplore, Conference Paper, Feb. 2002, DOI: 10.1109/ROBOT.2002.1014321, 9 pages.
IBM, "Robotics@IBM—Intelligent Connected Operations (ICO)," Robotics@IBM, Last Updated May 26, 2021, Accessed: Mar. 31, 2022, https://w3.ibm.com/w3publisher/ico-robotics, 5 pages.
Kowadio, "Advanced airflow modelling using naïve physics for odour localisation," ResearchGate, Jan. 2005, ttps://www.researchgate.net/publication/228679775_Advanced_airflow_modelling_using_naive_physics_for_odour_localisation, 11 pages.
Mell et al., "The NIST Definition of Cloud Computing", National Institute of Standards and Technology, Special Publication 800-145, Sep. 2011, 7 pages.
Swingler et al., "On the Duality of Robot and Sensor Path Planning," 52nd IEEE Conference on Decision and Control, Dec. 10-13, 2013, pp. 984-989.
The Boring Company, Website, Accessed: Mar. 31, 2022, https://www.boringcompany.com/, 7 pages.
Xu, "Path planning of mobile robot based on multi-sensor information fusion," EURASIP Journal on Wireless Communications and Networking, (2019) 2019:44, https://doi.org/10.1186/s13638-019-1352-1, 8 pages.

* cited by examiner

PATH DISCOVERY IN AN UNKNOWN ENCLOSED SURROUNDING BASED ON DIRECTION OF LIGHT AND AIR MOVEMENT

BACKGROUND

The present invention relates, generally, to the field of computing, and more particularly to autonomous robotic navigation.

An autonomous robot is a machine programmable by a computer and capable of carrying out a complex series of actions automatically without direct human control. Typically, the autonomous robots are used for navigation and utilize a computing device for decision making in a dedicated environment. For example, an autonomous robot may be a self-driving vehicle or a multipedal robot for navigating a challenging terrain.

SUMMARY

According to one embodiment, a method, computer system, and computer program product for path discovery in an unknown enclosed surrounding is provided. The present invention may include a processor that monitors location of a robot in an environment. The processor captures the environment with one or more environment sensors. The processor analyzes the captured environment to determine an exit location. The processor validates an exit route based on historical data and the exit location and communicates the exit route to the robot.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
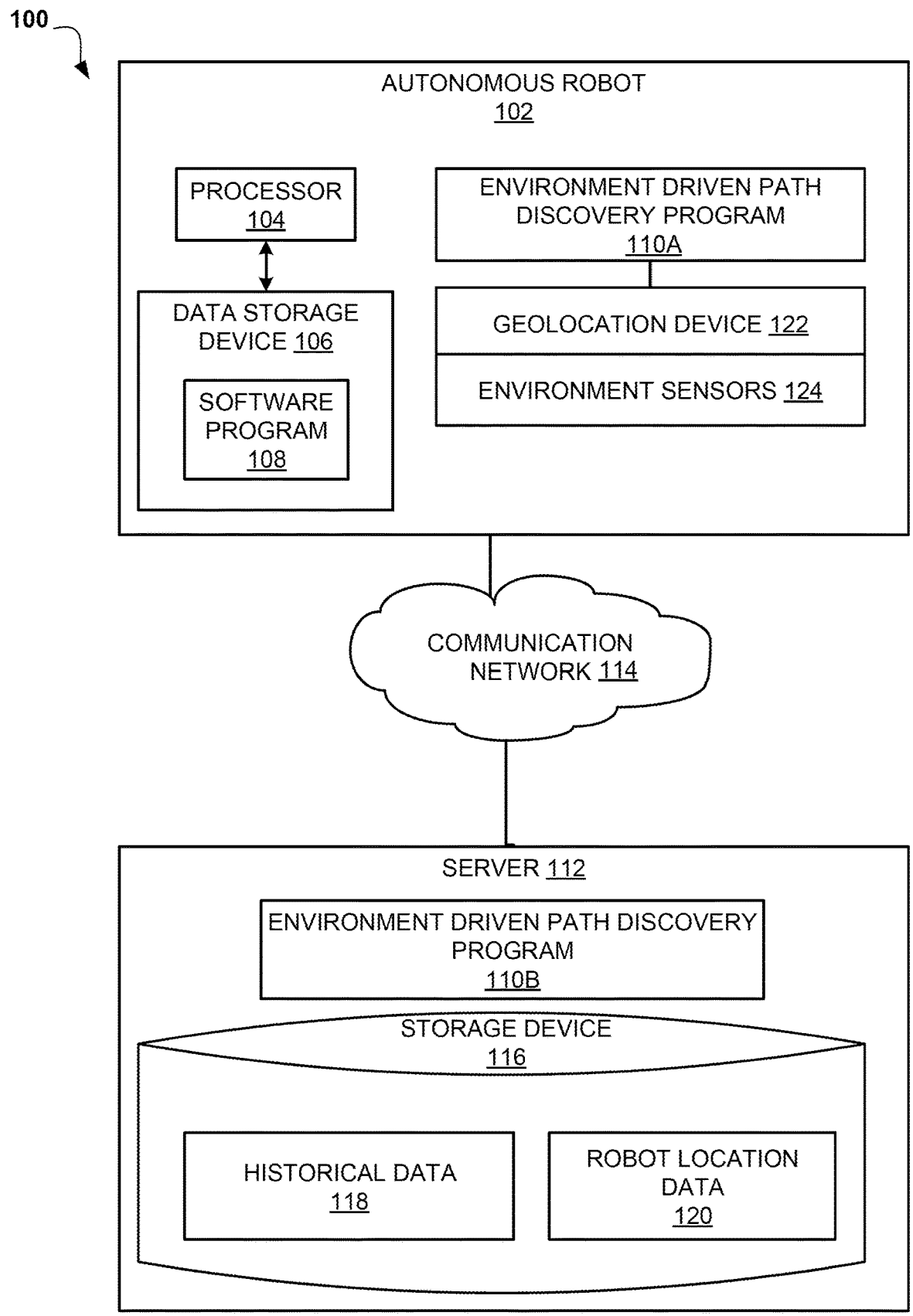
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to autonomous robotic navigation. The following described exemplary embodiments provide a system, method, and program product to, among other things, identify an alternative exit location for the autonomous robot utilizing environmental analysis, such as light sources and atmospheric flow parameters. Therefore, the present embodiment has the capacity to improve the technical field of autonomous robotic navigation by identifying an alternative exit route for an autonomous robot based on analysis of light and airflow in a closed environment.

As previously described, an autonomous robot is a machine programmable by a computer and capable of carrying out a complex series of actions automatically without direct human control. Typically, the autonomous robots are used for navigation and utilize a computing device for decision making in a dedicated environment. For example, autonomous robot may be a self-driving vehicle or a multipedal robot for navigating a challenging terrain.

Autonomous robots are widely used in exploration of confined spaces or inhospitable locations such as construction sites, caves or other locations where human beings cannot enter or may face dangerous conditions. These locations are typically unknown and, due to existing constraints, remote control of the autonomous robots may be impracticable either due to a distance or unavailability of electromagnetic waves, such as in water or below the surface of the earth. Furthermore, in such spaces the entrance point of the autonomous robot may become unavailable either due to blockage or otherwise, thus alternative solutions for exiting the enclosed spaces are frequently needed. As such, it may be advantageous to, among other things, implement a computerized method that analyzes the environment, such as through the identification of light sources and gas flow around the autonomous robot, and identify alternative exit routes in case the autonomous robot is off course and unable to escape using conventional navigation capabilities.

According to one embodiment, when an autonomous robot is off course or cannot exit an enclosed space, the environment of the robot, such as light and gas flow, may be analyzed to identify possible exit locations from the enclosed space. The array of sensors may analyze the light, its intensity and reflection and identify whether the entrance of the light may be used by the autonomous robot as an exit route. In a similar fashion, the autonomous robot may analyze the airflow around the autonomous robot and identify that the source of the flow may be an entrance to the enclosed space that may be exploited in order to plan an exit route. After identifying at least one exit route, the autonomous robot may be guided out of the enclosed space without human intervention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze the environmental surroundings of an autonomous robot and use the analysis to determine an exit route or an alternative exit location.

Referring to FIG. 1, an exemplary networked computer environment 100 is depicted, according to at least one embodiment. The networked computer environment 100 may include an autonomous robot 102 and a server 112 interconnected via a communication network 114. According to at least one implementation, the networked computer environment 100 may include a plurality of autonomous robots 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The autonomous robot 102 may include a processor 104, a geolocation device 122, environment sensors 124 and a data storage device 106 that is enabled to host and run a software program 108 and an environment-driven path discovery program 110A and communicate with the server 112 via the communication network 114, in accordance with one embodiment of the invention. Autonomous robot 102 may be, for example, a vehicle or any dynamic highly-mobile robot that incorporates any type of computing device capable of running a program and accessing a network. As will be discussed with reference to FIG. 3, the autonomous robot 102 may include internal components 302a and external components 304a, respectively. The geolocation device 122 may be a global positioning system (GPS) device, an array of cameras, or other radio or optical devices that are capable of identifying a location of the autonomous robot in an environment. The environment sensors 124 may be an array of sensors that can capture light or atmospheric (gas) flowrate or both. For example, environment sensors 124 may be one or more photo sensors capable of determining the origin of the light using triangulation, one or more piezoelectric sensors capable of measuring air or gas movement, airflow direction sensor, hot wire-based flow sensor or any other sensors capable of measuring flow of a gas around the autonomous robot 102 and direction and source of light.

The server computer 112 may be a laptop computer, netbook computer, personal computer (PC), a desktop computer, or any programmable electronic device or any network of programmable electronic devices capable of hosting and running an environment-driven path discovery program 110B and a storage device 116 and communicating with the autonomous robot 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located on another one or more autonomous robots such as autonomous robot 102 or in a cloud computing deployment model, such as a private cloud, community cloud, public cloud, or hybrid cloud. The storage device 116 may store a historical data 118 and robot location data 120 databases. The historical data 118 may include one or more records of previously identified exit routes or exit locations and, corresponding to each location, dimensions of the exit location for validation whether the autonomous robot 102 may pass through. Furthermore, historical data 118 may include, proportional to each exit location (opening), light intensity, light source dimensions, and speed and direction of the air passing through the exit location. Robot location data 120 may include one or more records of one or more autonomous robots that include the current location of the autonomous robot 102, the planned escape point of the autonomous robot 102 from the environment and a location of the identified exit location.

According to the present embodiment, the environment-driven path discovery program 110A, 110B may be a program capable of receiving and analyzing environmental data related to the surrounding light and gas flow and determining an exit route based on the analyzed environmental data. The environment-driven path discovery method is explained in further detail below with respect to FIG. 2.

Figure 2:
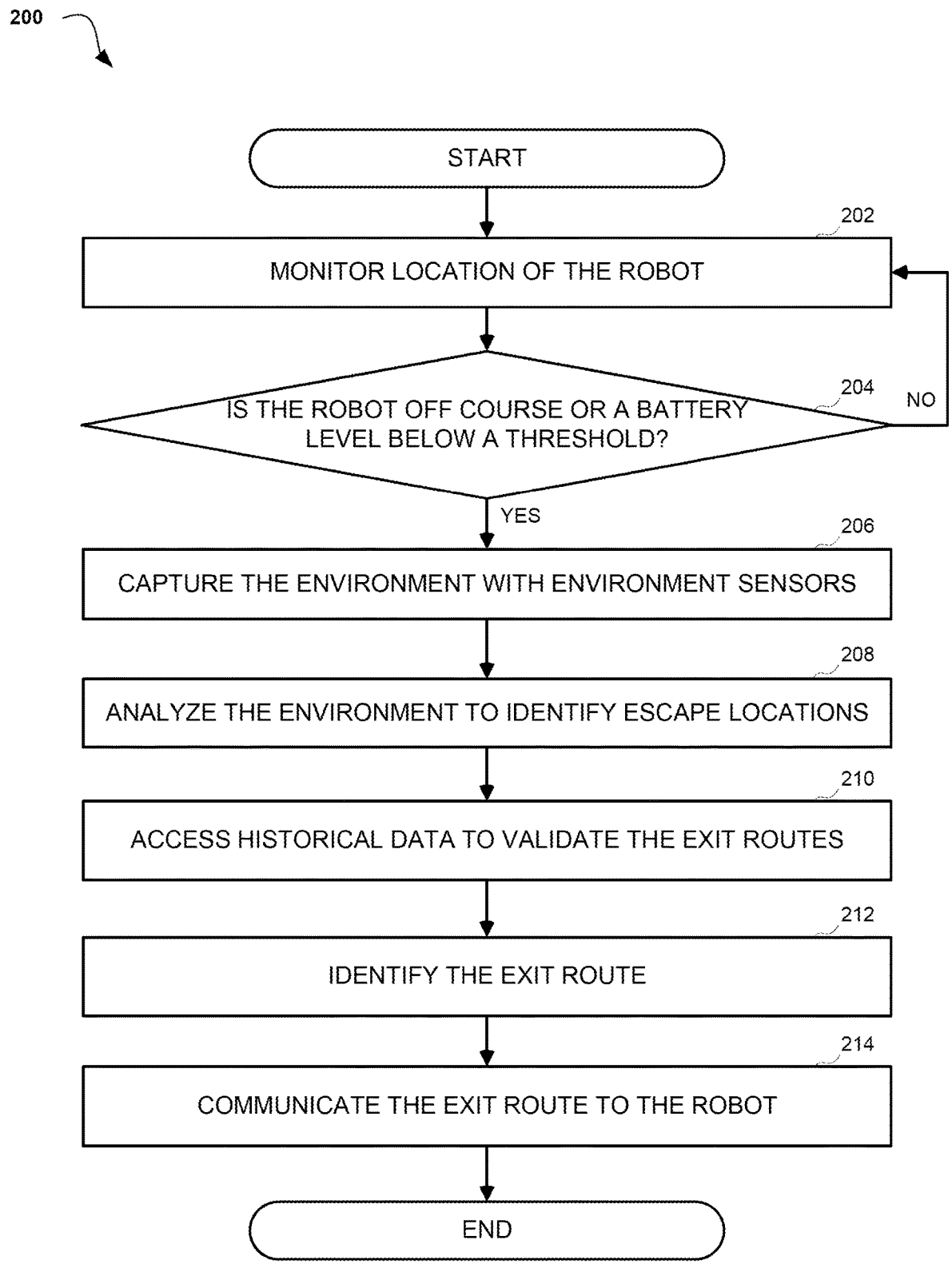
FIG. 2 is an operational flowchart illustrating an environment-driven path discovery process according to at least one embodiment.

Referring now to FIG. 2, an operational flowchart illustrating an environment-driven path discovery process 200 is depicted according to at least one embodiment. At 202, the environment-driven path discovery program 110A, 110B monitors a location of the robot. According to an example embodiment, the environment-driven path discovery program 110A, 110B may monitor the location of the autonomous robot 102 by accessing the geolocation device 122 or robot location data 120. For example, the environment-driven path discovery program 110A, 110B may monitor movements of the robot by accessing a radar or a camera located on autonomous robot 102.

Next, at 204, the environment-driven path discovery program 110A, 110B determines whether the robot is off course or a battery level is below a threshold. According to an example embodiment, the environment-driven path discovery program 110A, 110B may determine that the robot is off course based on comparing the location of the robot using geolocation device 122 to the planned route in robot location data 120. In another embodiment, the environment-driven path discovery program 110A, 110B may determine that the autonomous robot is off course when the data from the geolocation device 122 is not changing thus, the robot is not moving for a predetermined period of time. In addition, the environment-driven path discovery program 110A, 110B may monitor a status of the battery and, when the battery reaches a threshold charge level, trigger that same routine as when the autonomous robot is off course. If the environment-driven path discovery program 110A, 110B determines that the robot is off course or the battery level is below a threshold (step 204, "YES" branch), the environment-driven path discovery program 110A, 110B may continue to step 206 to capture the environment with environmental sensors. If the environment-driven path discovery program 110A, 110B determines that the robot is not off course or a battery level is not below a threshold (step 212, "NO" branch), the environment-driven path discovery program 110A, 110B may return to step 202 to monitor location of the robot.

Then, at 206, the environment-driven path discovery program 110A, 110B captures the environment with the environment sensors. According to an example embodiment, the environment-driven path discovery program 110A, 110B may control environment sensors 124 in order to capture light and flow to determine light sources and gas or fluid flow around the autonomous robot 102. The environment sensors 124 may be embedded or connected to the autonomous robot 102 from various sides to enable determination of the source of the light and the flowrate of the air or other surround gas or fluid. For example, environment sensors 124 may include a piezoelectric flow sensor, a hot wire sensor, a pitot tube, or anemometer-based sensors around the robot to determine the flow and direction of the surrounding atmosphere or fluid by measuring the speed of the flow from different parts of the robot. Furthermore, when the robot is moving, the speed of the robot may be determined using the geolocation device 122 and subtracted from the readings of the environment sensors 124 measured by flow sensors. In another embodiment, when the environment sensors 124 incorporate light sources, scanning devices, such as by using a camera, a thermal spectrometer or a photon measuring sensor, the environment-driven path discovery program 110A, 110B may capture data from the photo sensors in order to identify light sources and their location.

Next, at 208, the environment-driven path discovery program 110A, 110B analyzes the environment to identify exit locations. The light reflection and direction and the flow direction and intensity may indicate the location of an area that the autonomous robot may utilize to exit the enclosed space. Thus, according to an example embodiment, the environment-driven path discovery program 110A, 110B may analyze the light sources to determine whether a specific light source is an opening out of an enclosed space, the distance to the opening and the size of the opening. In another embodiment, the environment-driven path discovery program 110A, 110B may analyze the flow of the atmosphere or fluid around the robot and determine the direction and magnitude of the flow for identification of sources of the flow and locations where the atmosphere escapes the environment. According to an example embodiment, the environment-driven path discovery program 110A, 110B may use separate trained neural networks that receive a vector, such as a vector of light or a vector of flow and returns a probable size of the exit location. Each vector may include coordinates of the autonomous robot, coordinates of the light source, light intensity, and spectrum data. In another embodiment, a trained neural network may receive both light and flow data and return probable size of the exit area and probable distance to the area.

Then, at 210, the environment-driven path discovery program 110A, 110B accesses historical data to validate the exit routes. According to an example embodiment, the environment-driven path discovery program 110A, 110B may access a maintained database of previous environment data that stores exit routes, dimensions of an opening, and the area of the probable exit location in historical data 118. For example, historical data 118 may have a record at the similar location that had a source of natural light that, coupled with an air flow from the same source of light, is an escape point that the autonomous robot can pass through. In another embodiment, the historical data 118 may include the dimensions of the exit area and the environment-driven path discovery program 110A, 110B may identify one or more similar conditions and predict the current area and dimensions of an exit location based on linear interpolation of the environment data in the historical data 118 from the identified similar conditions in the historical data 118. In another embodiment, the historical data 118 may store weather conditions for each record and the environment-driven path discovery program 110A, 110B may determine (via communication network 114) the current weather in order to normalize the measured environmental data to the weather. For example, when the wind speed measured by the environment-driven path discovery program 110A, 110B is above the weather received wind speed, the environment-driven path discovery program 110A, 110B may infer that there is a considerable narrowing at the exit location or that the wind is artificially generated by other equipment.

Next, at 212, the environment-driven path discovery program 110A, 110B identifies the exit route. According to an example embodiment, the environment-driven path discovery program 110A, 110B may determine whether the autonomous robot may pass through the probable exit location based on comparing the predicted area and the actual size of the autonomous robot. When the autonomous robot is capable of passing through the probable exit location, the environment-driven path discovery program 110A, 110B may check whether a battery level is sufficient to use the alternative exit location by determining the distance to the exit location and comparing or traversing the estimated energy (a threshold value) required to reach the alternative exit location to current power level of the battery.

Then, at 214, the environment-driven path discovery program 110A, 110B communicates the exit route to the robot. According to an example embodiment, the environment-driven path discovery program 110A, 110B may transfer the exit route or a location of the probable exit location to the autonomous robot using an application programming interface (API). In another embodiment, the environment-driven path discovery program 110A, 110B may update the location of the probable exit location in the robot location data 120 so that other autonomous robots may use the exit location.

It may be appreciated that FIG. 2 provides only an illustration of one implementation and does not imply any limitations with regard to how different embodiments may be implemented. Many modifications to the depicted environments may be made based on design and implementation requirements. For example, the same approach may be used for underwater autonomous vehicles that may determine escape routes based on analyzing the light and the flow direction of water. In another embodiment, one or more autonomous robots may guide other autonomous robots to an exit location based on generating a light or a flow that indicates to other autonomous robots the exit location without sending the data via communication network 114.

Figure 3:
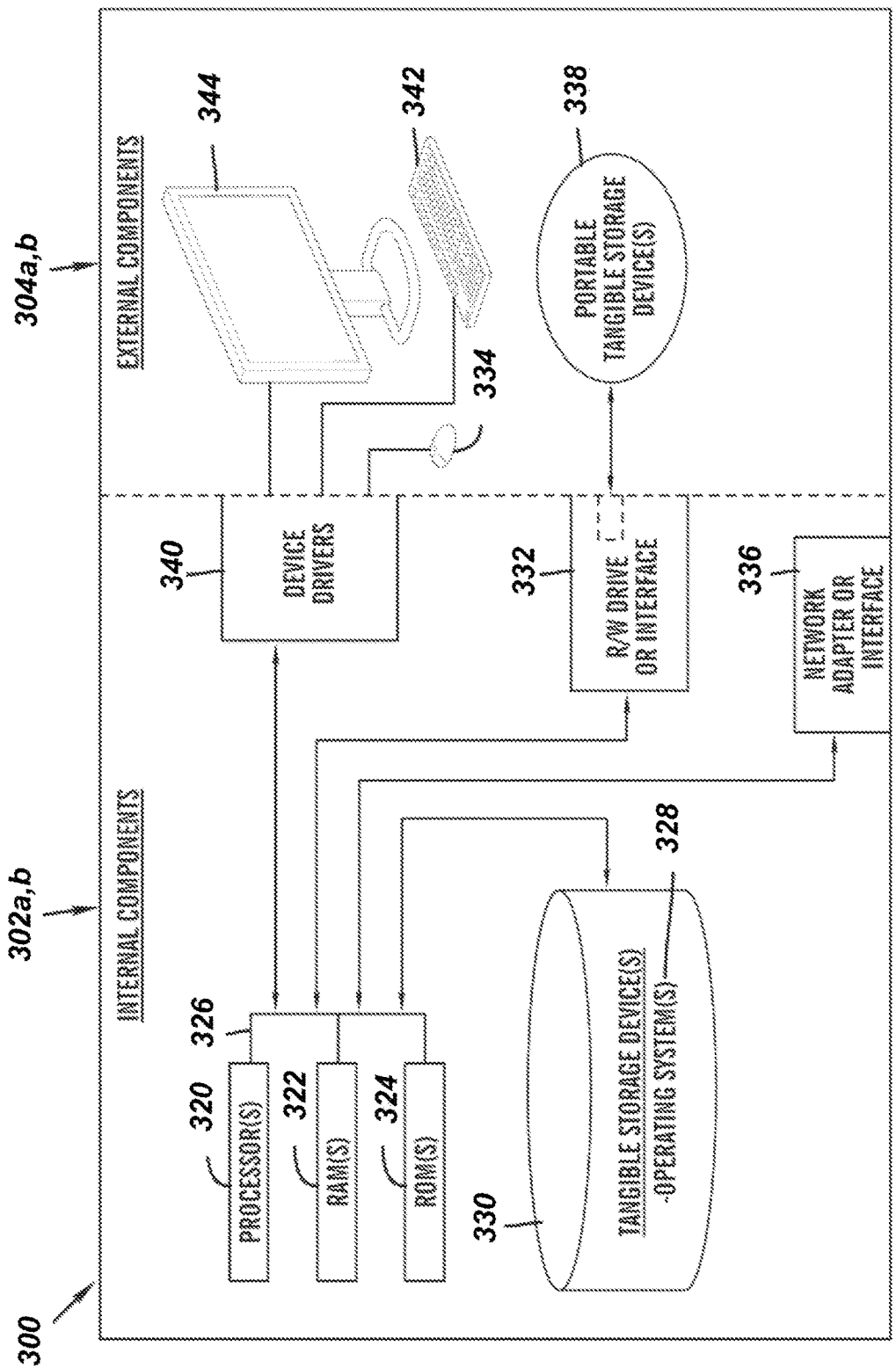
FIG. 3 is a block diagram of internal and external components of computers and servers depicted in FIG. 1 according to at least one embodiment.

FIG. 3 is a block diagram 300 of internal and external components of autonomous robot 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The autonomous robot 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the environment-driven path discovery program 110A in the autonomous robot 102, and the environment-driven path discovery program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a RAY drive or interface 332 to read from and write to one or more portable computer-readable tangible storage devices 338 such as a CD-ROM, DVD, memory stick, magnetic tape, magnetic disk, optical disk or semiconductor storage device. A software program, such as the environment-driven path discovery program 110A, 110B, can be stored on one or more of the respective portable computer-readable tangible storage devices 338, read via the respective RAY drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The software program 108 and the environment-driven path discovery program 110A in the autonomous robot 102 and the environment-driven path discovery program 110B in the server 112 can be downloaded to the autonomous robot 102 and the server 112 from an external computer via a network (for example, the Internet, a local area network or other, wide area network) and respective network adapters or interfaces 336. From the network adapters or interfaces 336, the software program 108 and the environment-driven path discovery program 110A in the autonomous robot 102 and the environment-driven path discovery program 110B in the server 112 are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices. Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
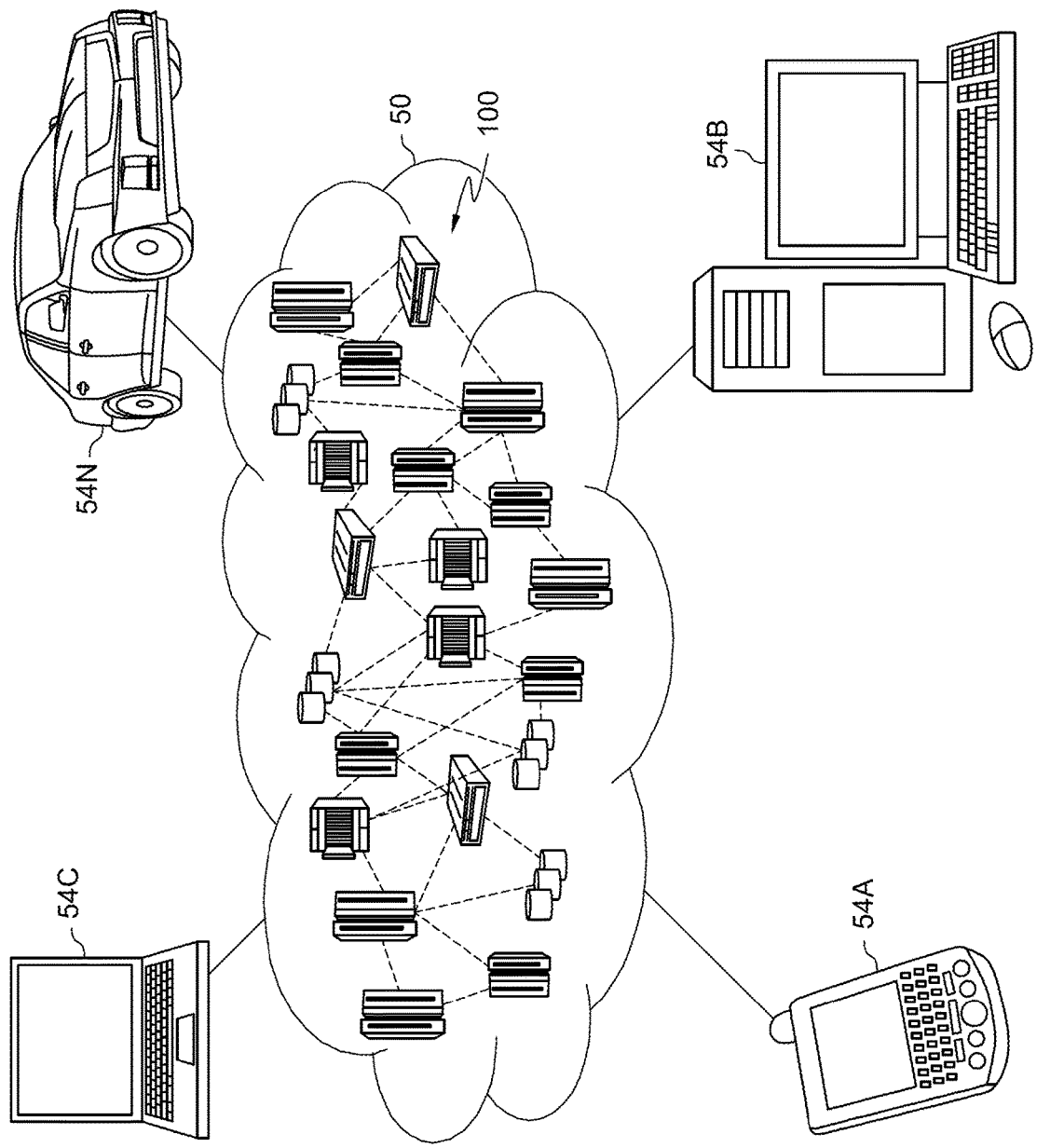
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
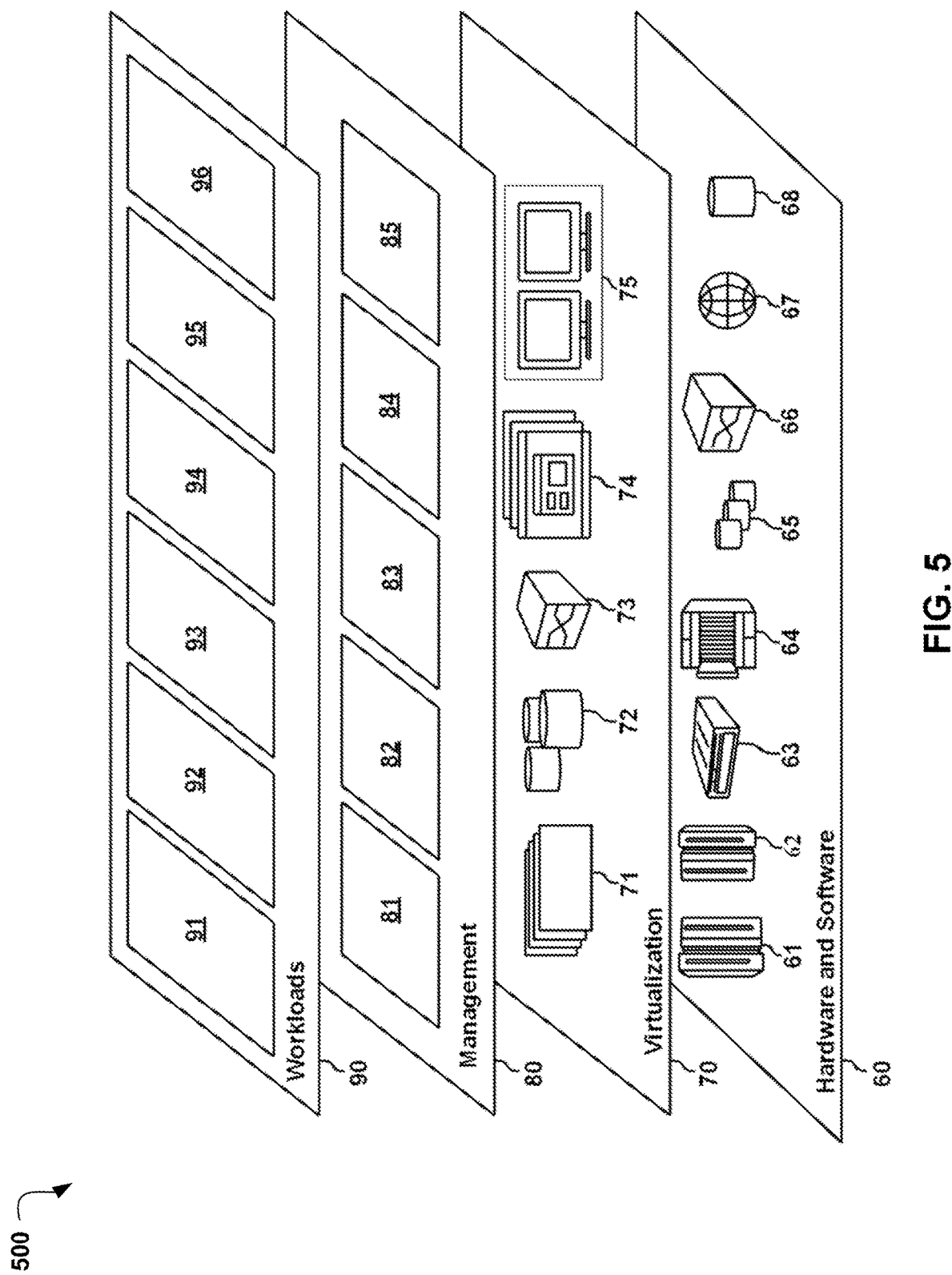
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and environment drive path discovery 96. Environment-driven path discovery 96 may relate to analyzing the environment with sensors that identify light and flow of fluid or air around the robot and, based on the received data, determines whether the autonomous robot may use the location of the light or a path along the flow of the fluid to generate an alternative exit route for the autonomous robot.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for path discovery in an unknown enclosed surrounding, the method comprising:
    monitoring a location of a robot in an environment via a global positioning system (GPS);
    capturing the environment with one or more environment sensors communicatively coupled with the robot, wherein the captured environment includes at least one light origin and at least one direction of airflow within the unknown enclosed surrounding;
    analyzing the captured environment to determine an exit route and an exit location, based on the at least one light origin and the at least one direction of airflow within the unknown enclosed surrounding;
    predicting dimensions of the exit location based on an interpolation of environmental data and historical light locations combined with airflow;
    validating the exit route based on historical data and the exit location; and
    guiding the robot to the exit location.

2. The method of claim 1, wherein the one or more environment sensors comprise a group consisting of a piezoelectric flow sensor, a hot wire sensor, a pitot tube, an anemometer, a camera, a thermal spectrometer, and a photon measuring sensor.

3. The method of claim 1, wherein analyzing the captured environment to determine the exit location is by a trained neural network.

4. The method of claim 1, wherein monitoring the location of the robot in the environment further comprises:
    checking a battery level of the robot is above a threshold.

5. The method of claim 1, wherein validating the exit route exit location further comprises:

checking whether an estimated power consumed by traversing the exit route is within a threshold value.

6. The method of claim 1, wherein communicating the exit route to the robot is performed using an application programming interface.

7. The method of claim 1, further comprising:
generating a light by the robot to assist one or more other robots to identify the exit location.

8. A computer system for path discovery in an unknown enclosed surrounding, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
monitoring a location of a robot in an environment via a global positioning system (GPS);
capturing the environment with one or more environment sensors communicatively coupled with the robot, wherein the captured environment includes at least one light origin and at least one direction of airflow within the unknown enclosed surrounding;
analyzing the captured environment to determine an exit route and an exit location, based on the at least one light origin and the at least one direction of airflow within the unknown enclosed surrounding;
predicting dimensions of the exit location based on an interpolation of environmental data and historical light locations combined with airflow;
validating the exit route based on historical data and the exit location; and
guiding the robot to the exit location.

9. The computer system of claim 8, wherein the one or more environment sensors comprise a group consisting of a piezoelectric flow sensor, a hot wire sensor, a pitot tube, an anemometer, a camera, a thermal spectrometer, and a photon measuring sensor.

10. The computer system of claim 8, wherein analyzing the captured environment to determine the exit location is by a trained neural network.

11. The computer system of claim 8, wherein monitoring the location of the robot in the environment further comprises:
checking a battery level of the robot is above a threshold.

12. The computer system of claim 8, wherein validating the exit route exit location further comprises:
checking whether an estimated power consumed by traversing the exit route is within a threshold value.

13. The computer system of claim 8, wherein communicating the exit route to the robot is performed using an application programming interface.

14. The computer system of claim 8, further comprising:
generating a light by the robot to assist one or more other robots to identify the exit location.

15. A computer program product for path discovery in an unknown enclosed surrounding, the computer program product comprising:
one or more computer-readable tangible storage medium and program instructions stored on at least one of the one or more tangible storage medium, the program instructions executable by a processor, the program instructions comprising:
program instructions to monitor a location of a robot in an environment via a global positioning system (GPS);
program instructions to capture the environment with one or more environment sensors communicatively coupled with the robot, wherein the captured environment includes at least one light origin and at least one direction of airflow within the unknown enclosed surrounding;
program instructions to analyze the captured environment to determine an exit route and an exit location, based on the at least one light origin and the at least one direction of airflow within the unknown enclosed surrounding;
program instructions to predict dimensions of the exit location based on an interpolation of environmental data and historical light locations combined with airflow;
program instructions to validate the exit route based on historical data and the exit location; and
program instructions to guide the robot to the exit location.

16. The computer program product of claim 15, wherein the one or more environment sensors comprise a group consisting of a piezoelectric flow sensor, a hot wire sensor, a pitot tube, an anemometer, a camera, a thermal spectrometer, and a photon measuring sensor.

17. The computer program product of claim 15, wherein program instructions to analyze the captured environment to determine the exit location is by a trained neural network.

18. The computer program product of claim 15, wherein program instructions to monitor the location of the robot in the environment further comprises:
checking a battery level of the robot is above a threshold.

19. The computer program product of claim 15, wherein program instructions to validate the exit route exit location further comprises:
program instructions to check whether an estimated power consumed by traversing the exit route is within a threshold value.

20. The computer program product of claim 15, wherein program instructions to communicate the exit route to the robot is performed using an application programming interface.

* * * * *